(12) United States Patent
Geoffroy et al.

(10) Patent No.: US 8,077,935 B2
(45) Date of Patent: Dec. 13, 2011

(54) METHODS AND APPARATUS FOR ACQUIRING A SWIPED FINGERPRINT IMAGE

(75) Inventors: David J. Geoffroy, Amherst, MA (US); Jeffrey J. Buxton, North Andover, MA (US)

(73) Assignee: Validity Sensors, Inc., San Jose, CA (US)

( * ) Notice: Subject to any disclaimer, the term of this patent is extended or adjusted under 35 U.S.C. 154(b) by 1081 days.

(21) Appl. No.: 11/112,338

(22) Filed: Apr. 22, 2005

(65) Prior Publication Data

US 2005/0244039 A1    Nov. 3, 2005

Related U.S. Application Data

(60) Provisional application No. 60/564,791, filed on Apr. 23, 2004.

(51) Int. Cl.
G06K 9/00 (2006.01)
G06K 7/00 (2006.01)
G01R 27/26 (2006.01)

(52) U.S. Cl. ........ 382/126; 382/124; 382/312; 382/106; 340/5.83; 324/686

(58) Field of Classification Search .......... 382/106, 382/107, 124, 125, 126, 312; 340/5.52–5.54, 340/5.82–5.84; 324/686
See application file for complete search history.

(56) References Cited

U.S. PATENT DOCUMENTS

| | | | |
|---|---|---|---|
| 4,151,512 A | 4/1979 | Riganati et al. | |
| 4,310,827 A | 1/1982 | Asi | |
| 4,353,056 A | 10/1982 | Tsikos | |
| 4,405,829 A | 9/1983 | Rivest et al. | |
| 4,525,859 A | 6/1985 | Bowles et al. | |
| 4,550,221 A | 10/1985 | Mabusth | |
| 4,580,790 A | 4/1986 | Doose | |
| 4,758,622 A | 7/1988 | Gosselin | |
| 4,817,183 A | 3/1989 | Sparrow | |
| 5,076,566 A | 12/1991 | Kriegel | |
| 5,109,427 A | 4/1992 | Yang | |

(Continued)

FOREIGN PATENT DOCUMENTS

DE    2213813    10/1973

(Continued)

OTHER PUBLICATIONS

Search Report Mailed Sep. 26, 2002 for International Application No. PCT/US2001/46525.

(Continued)

Primary Examiner — Jason M Repko
Assistant Examiner — Mia M Thomas
(74) Attorney, Agent, or Firm — Greenberg Traurig LLP; Cecily Anne O'Regan; William C. Cray

(57) ABSTRACT

A method for assisting a user of a fingerprint sensing system includes sensing a position of a user's finger relative to a swiped fingerprint image sensor, and providing to the user, in response to the sensed finger position, an indication of finger placement relative to the fingerprint image sensor. The indication of finger placement may include a display on a computer monitor of actual finger placement and desired finger placement. The fingerprint sensing system may include an image sensor to sense a fingerprint on a swiped finger, a finger position sensor to sense the position of the finger relative to the image sensor, and processing apparatus to provide the indication of finger placement to the user.

27 Claims, 13 Drawing Sheets

U.S. PATENT DOCUMENTS

| | | | |
|---|---|---|---|
| 5,140,642 A | 8/1992 | Hau et al. | |
| 5,305,017 A | 4/1994 | Gerpheide | |
| 5,319,323 A | 6/1994 | Fong | |
| 5,325,442 A | 6/1994 | Knapp | |
| 5,420,936 A | 5/1995 | Fitzpatrick et al. | |
| 5,422,807 A | 6/1995 | Mitra et al. | |
| 5,543,591 A | 8/1996 | Gillespie et al. | |
| 5,569,901 A | 10/1996 | Bridgelall et al. | |
| 5,623,552 A * | 4/1997 | Lane | 382/124 |
| 5,627,316 A | 5/1997 | De Winter et al. | |
| 5,650,842 A * | 7/1997 | Maase et al. | 356/71 |
| 5,717,777 A | 2/1998 | Wong et al. | |
| 5,781,651 A | 7/1998 | Hsiao et al. | |
| 5,801,681 A | 9/1998 | Sayag | |
| 5,818,956 A | 10/1998 | Tuli | |
| 5,838,306 A | 11/1998 | O'Connor | |
| 5,852,670 A | 12/1998 | Setlak et al. | |
| 5,887,343 A * | 3/1999 | Salatino et al. | 29/833 |
| 5,892,824 A | 4/1999 | Beatson et al. | |
| 5,903,225 A | 5/1999 | Schmitt et al. | |
| 5,915,757 A | 6/1999 | Tsuyama et al. | |
| 5,920,384 A | 7/1999 | Borza | |
| 5,920,640 A * | 7/1999 | Salatino et al. | 382/124 |
| 5,940,526 A | 8/1999 | Setlak et al. | |
| 5,999,637 A | 12/1999 | Toyoda et al. | |
| 6,002,815 A | 12/1999 | Immega et al. | |
| 6,016,355 A | 1/2000 | Dickinson et al. | |
| 6,052,475 A | 4/2000 | Upton | |
| 6,067,368 A * | 5/2000 | Setlak et al. | 382/124 |
| 6,073,343 A * | 6/2000 | Petrick et al. | 29/825 |
| 6,076,566 A | 6/2000 | Lowe | |
| 6,088,585 A * | 7/2000 | Schmitt et al. | 455/411 |
| 6,098,175 A | 8/2000 | Lee | |
| 6,134,340 A * | 10/2000 | Hsu et al. | 382/124 |
| 6,157,722 A | 12/2000 | Lerner et al. | |
| 6,161,213 A | 12/2000 | Lofstrom | |
| 6,182,076 B1 | 1/2001 | Yu et al. | |
| 6,182,892 B1 | 2/2001 | Angelo et al. | |
| 6,185,318 B1 | 2/2001 | Jain et al. | |
| 6,241,288 B1 * | 6/2001 | Bergenek et al. | 283/67 |
| 6,259,108 B1 | 7/2001 | Antonelli et al. | |
| 6,289,114 B1 * | 9/2001 | Mainguet | 382/124 |
| 6,317,508 B1 | 11/2001 | Kramer et al. | |
| 6,320,394 B1 | 11/2001 | Tartagni | |
| 6,332,193 B1 | 12/2001 | Glass et al. | |
| 6,333,989 B1 | 12/2001 | Borza | |
| 6,346,739 B1 | 2/2002 | Lepert et al. | |
| 6,347,040 B1 * | 2/2002 | Fries et al. | 361/760 |
| 6,362,633 B1 | 3/2002 | Tartagni | |
| 6,392,636 B1 | 5/2002 | Ferrari et al. | |
| 6,400,836 B2 | 6/2002 | Senior | |
| 6,408,087 B1 | 6/2002 | Kramer | |
| 6,473,072 B1 | 10/2002 | Comiskey et al. | |
| 6,509,501 B2 | 1/2003 | Eicken et al. | |
| 6,539,101 B1 * | 3/2003 | Black | 382/124 |
| 6,580,816 B2 | 6/2003 | Kramer et al. | |
| 6,597,289 B2 | 7/2003 | Sabatini | |
| 6,643,389 B1 * | 11/2003 | Raynal et al. | 382/124 |
| 6,672,174 B2 | 1/2004 | Deconde et al. | |
| 6,738,050 B2 | 5/2004 | Comiskey et al. | |
| 6,741,729 B2 | 5/2004 | Bjorn et al. | |
| 6,757,002 B1 | 6/2004 | Oross et al. | |
| 6,766,040 B1 | 7/2004 | Catalano et al. | |
| 6,785,407 B1 * | 8/2004 | Tschudi et al. | 382/124 |
| 6,838,905 B1 | 1/2005 | Doyle | |
| 6,886,104 B1 | 4/2005 | McClurg et al. | |
| 6,897,002 B2 | 5/2005 | Teraoka et al. | |
| 6,898,299 B1 | 5/2005 | Brooks | |
| 6,937,748 B1 * | 8/2005 | Schneider et al. | 382/126 |
| 6,941,001 B1 | 9/2005 | Bolle et al. | |
| 6,941,810 B2 | 9/2005 | Okada | |
| 6,950,540 B2 | 9/2005 | Higuchi | |
| 6,959,874 B2 | 11/2005 | Bardwell | |
| 6,963,626 B1 | 11/2005 | Shaeffer et al. | |
| 6,970,584 B2 * | 11/2005 | O'Gorman et al. | 382/126 |
| 6,980,672 B2 * | 12/2005 | Saito et al. | 382/124 |
| 6,983,882 B2 | 1/2006 | Cassone | |
| 7,020,591 B1 | 3/2006 | Wei et al. | |
| 7,030,860 B1 | 4/2006 | Hsu et al. | |
| 7,042,535 B2 | 5/2006 | Katoh et al. | |
| 7,046,230 B2 | 5/2006 | Zadesky et al. | |
| 7,064,743 B2 | 6/2006 | Nishikawa | |
| 7,099,496 B2 | 8/2006 | Benkley | |
| 7,110,577 B1 | 9/2006 | Tschud | |
| 7,113,622 B2 * | 9/2006 | Hamid | 382/124 |
| 7,126,389 B1 | 10/2006 | McRae et al. | |
| 7,129,926 B2 | 10/2006 | Mathiassen et al. | |
| 7,136,514 B1 * | 11/2006 | Wong | 382/124 |
| 7,146,024 B2 * | 12/2006 | Benkley, III | 382/107 |
| 7,146,029 B2 * | 12/2006 | Manansala | 382/126 |
| 7,194,392 B2 | 3/2007 | Tuken et al. | |
| 7,197,168 B2 | 3/2007 | Russo | |
| 7,200,250 B2 * | 4/2007 | Chou | 382/124 |
| 7,251,351 B2 | 7/2007 | Mathiassen et al. | |
| 7,258,279 B2 * | 8/2007 | Schneider et al. | 235/486 |
| 7,260,246 B2 * | 8/2007 | Fujii | 382/124 |
| 7,290,323 B2 * | 11/2007 | Deconde et al. | 29/595 |
| 7,308,122 B2 * | 12/2007 | McClurg et al. | 382/124 |
| 7,321,672 B2 | 1/2008 | Sasaki et al. | |
| 7,360,688 B1 | 4/2008 | Harris | |
| 7,379,569 B2 | 5/2008 | Chikazawa et al. | |
| 7,403,644 B2 * | 7/2008 | Bohn et al. | 382/126 |
| 7,409,876 B2 | 8/2008 | Ganapathi et al. | |
| 7,412,083 B2 | 8/2008 | Takahashi | |
| 7,424,618 B2 * | 9/2008 | Roy et al. | 713/186 |
| 7,447,911 B2 * | 11/2008 | Chou et al. | 713/186 |
| 7,460,697 B2 | 12/2008 | Erhart et al. | |
| 7,463,756 B2 | 12/2008 | Benkley | |
| 7,505,611 B2 | 3/2009 | Fyke | |
| 7,505,613 B2 | 3/2009 | Russo | |
| 7,574,022 B2 * | 8/2009 | Russo | 382/124 |
| 7,643,950 B1 | 1/2010 | Getzin et al. | |
| 7,646,897 B2 | 1/2010 | Fyke | |
| 7,681,232 B2 | 3/2010 | Nordentoft et al. | |
| 7,751,601 B2 | 7/2010 | Benkley | |
| 7,754,022 B2 | 7/2010 | Barnhill et al. | |
| 7,843,438 B2 | 11/2010 | Onoda | |
| 7,953,258 B2 | 5/2011 | Dean et al. | |
| 2001/0026636 A1 | 10/2001 | Mainget | |
| 2001/0030644 A1 | 10/2001 | Allport | |
| 2001/0036299 A1 | 11/2001 | Senior | |
| 2001/0043728 A1 | 11/2001 | Kramer et al. | |
| 2002/0025062 A1 * | 2/2002 | Black | 382/116 |
| 2002/0061125 A1 * | 5/2002 | Fujii | 382/125 |
| 2002/0067845 A1 * | 6/2002 | Griffis | 382/107 |
| 2002/0073046 A1 | 6/2002 | David | |
| 2002/0089410 A1 * | 7/2002 | Janiak et al. | 340/5.53 |
| 2002/0122026 A1 * | 9/2002 | Bergstrom | 345/157 |
| 2002/0126516 A1 | 9/2002 | Jeon | |
| 2002/0133725 A1 | 9/2002 | Roy et al. | 713/202 |
| 2002/0181749 A1 * | 12/2002 | Matsumoto et al. | 382/125 |
| 2003/0002717 A1 * | 1/2003 | Hamid | 382/124 |
| 2003/0002719 A1 | 1/2003 | Hamid et al. | |
| 2003/0021495 A1 | 1/2003 | Cheng | |
| 2003/0035570 A1 * | 2/2003 | Benkley, III | 382/124 |
| 2003/0068072 A1 | 4/2003 | Hamid | |
| 2003/0076301 A1 | 4/2003 | Tsuk et al. | |
| 2003/0076303 A1 | 4/2003 | Huppi | |
| 2003/0095096 A1 | 5/2003 | Robbin et al. | |
| 2003/0102874 A1 | 6/2003 | Lane et al. | |
| 2003/0123714 A1 | 7/2003 | O'Gorman et al. | |
| 2003/0141959 A1 | 7/2003 | Keogh et al. | |
| 2003/0147015 A1 | 8/2003 | Katoh et al. | |
| 2003/0161512 A1 | 8/2003 | Mathiassen et al. | |
| 2003/0169228 A1 | 9/2003 | Mathiassen et al. | |
| 2003/0174871 A1 | 9/2003 | Yoshioka et al. | |
| 2003/0186157 A1 | 10/2003 | Teraoka et al. | |
| 2003/0209293 A1 | 11/2003 | Sako et al. | |
| 2003/0224553 A1 | 12/2003 | Manansala | |
| 2004/0012773 A1 | 1/2004 | Puttkammer | |
| 2004/0022001 A1 | 2/2004 | Chu et al. | |
| 2004/0042642 A1 * | 3/2004 | Bolle et al. | 382/115 |
| 2004/0050930 A1 | 3/2004 | Rowe | |
| 2004/0066613 A1 | 4/2004 | Leitao | |
| 2004/0076314 A1 * | 4/2004 | Cheng | 382/126 |
| 2004/0081339 A1 | 4/2004 | Benkley | |
| 2004/0096086 A1 * | 5/2004 | Miyasaka et al. | 382/124 |

| | | | | | | |
|---|---|---|---|---|---|---|
| 2004/0113956 A1* | 6/2004 | Bellwood et al. ............. 345/863 | | 2008/0179112 A1 | 7/2008 | Qin et al. |
| 2004/0120400 A1 | 6/2004 | Linzer | | 2008/0185429 A1 | 8/2008 | Saville |
| 2004/0125993 A1* | 7/2004 | Zhao et al. .................... 382/124 | | 2008/0205714 A1 | 8/2008 | Benkley et al. |
| 2004/0129787 A1 | 7/2004 | Saito | | 2008/0219521 A1 | 9/2008 | Benkley et al. |
| 2004/0136612 A1 | 7/2004 | Meister et al. | | 2008/0222049 A1 | 9/2008 | Loomis et al. |
| 2004/0172339 A1* | 9/2004 | Snelgrove et al. ............. 705/26 | | 2008/0223925 A1 | 9/2008 | Saito et al. |
| 2004/0179718 A1 | 9/2004 | Chou | | 2008/0226132 A1 | 9/2008 | Gardner |
| 2004/0184641 A1* | 9/2004 | Nagasaka et al. ............. 382/124 | | 2008/0240523 A1 | 10/2008 | Benkley et al. |
| 2004/0190761 A1 | 9/2004 | Lee | | 2008/0244277 A1 | 10/2008 | Orsini et al. |
| 2004/0208346 A1 | 10/2004 | Baharav et al. | | 2008/0267462 A1 | 10/2008 | Nelson et al. |
| 2004/0208347 A1 | 10/2004 | Baharav et al. | | 2008/0279373 A1 | 11/2008 | Erhart et al. |
| 2004/0208348 A1* | 10/2004 | Baharav et al. ............... 382/124 | | 2009/0130369 A1 | 5/2009 | Huang et al. |
| 2004/0213441 A1 | 10/2004 | Tschudi | | 2009/0153297 A1 | 6/2009 | Gardner |
| 2004/0215689 A1* | 10/2004 | Dooley et al. .................. 709/200 | | 2009/0154779 A1 | 6/2009 | Satyan et al. |
| 2004/0228505 A1 | 11/2004 | Sugimoto | | 2009/0155456 A1 | 6/2009 | Benkley et al. |
| 2004/0228508 A1 | 11/2004 | Shigeta | | 2009/0169071 A1 | 7/2009 | Bond et al. |
| 2004/0240712 A1 | 12/2004 | Rowe et al. | | 2009/0174974 A1 | 7/2009 | Huang et al. |
| 2004/0252867 A1 | 12/2004 | Lan et al. | | 2009/0252384 A1 | 10/2009 | Dean et al. |
| 2005/0036665 A1* | 2/2005 | Higuchi ........................ 382/124 | | 2009/0252385 A1 | 10/2009 | Dean et al. |
| 2005/0047485 A1* | 3/2005 | Khayrallah et al. .......... 375/148 | | 2009/0252386 A1 | 10/2009 | Dean et al. |
| 2005/0100196 A1 | 5/2005 | Scott et al. | | 2009/0319435 A1 | 12/2009 | Little et al. |
| 2005/0109835 A1 | 5/2005 | Jacoby et al. | | 2009/0324028 A1* | 12/2009 | Russo ........................... 382/125 |
| 2005/0110103 A1 | 5/2005 | Setlak | | 2010/0026451 A1 | 2/2010 | Erhart et al. |
| 2005/0136200 A1 | 6/2005 | Durell et al. | | 2010/0045705 A1* | 2/2010 | Vertegaal et al. ............. 345/661 |
| 2005/0139656 A1 | 6/2005 | Arnouse | | 2010/0083000 A1 | 4/2010 | Kesanupalli et al. |
| 2005/0162402 A1* | 7/2005 | Watanachote ................ 345/173 | | 2010/0119124 A1 | 5/2010 | Satyan |
| 2005/0169503 A1* | 8/2005 | Howell et al. ................. 382/115 | | 2010/0123675 A1 | 5/2010 | Ippel |
| 2005/0210271 A1* | 9/2005 | Chou et al. .................... 713/186 | | 2010/0127366 A1 | 5/2010 | Bond et al. |
| 2005/0219200 A1 | 10/2005 | Weng | | 2010/0176823 A1 | 7/2010 | Thompson et al. |
| 2005/0231213 A1 | 10/2005 | Chou et al. | | 2010/0176892 A1 | 7/2010 | Thompson et al. |
| 2005/0238212 A1 | 10/2005 | Du et al. | | 2010/0177940 A1 | 7/2010 | Thompson et al. |
| 2005/0244038 A1 | 11/2005 | Benkley | | 2010/0180136 A1 | 7/2010 | Thompson et al. |
| 2005/0244039 A1 | 11/2005 | Geoffroy et al. | | 2010/0189314 A1 | 7/2010 | Benkley et al. |
| 2005/0249386 A1 | 11/2005 | Juh | | 2010/0208953 A1 | 8/2010 | Gardner et al. |
| 2005/0259852 A1* | 11/2005 | Russo ........................... 382/124 | | 2010/0244166 A1 | 9/2010 | Shibuta et al. |
| 2005/0269402 A1 | 12/2005 | Spitzer et al. | | 2010/0272329 A1 | 10/2010 | Benkley |
| 2006/0006224 A1 | 1/2006 | Modi | | 2010/0284565 A1 | 11/2010 | Benkley et al. |
| 2006/0055500 A1 | 3/2006 | Burke et al. | | 2011/0002461 A1 | 1/2011 | Erhart et al. |
| 2006/0066572 A1 | 3/2006 | Yumoto et al. | | 2011/0102567 A1 | 5/2011 | Erhart |
| 2006/0078176 A1 | 4/2006 | Abiko et al. | | 2011/0102569 A1 | 5/2011 | Erhart |
| 2006/0083411 A1 | 4/2006 | Benkley | | | | |
| 2006/0110537 A1 | 5/2006 | Huang et al. | | | FOREIGN PATENT DOCUMENTS | |
| 2006/0140461 A1 | 6/2006 | Kim et al. | | | | |
| 2006/0144953 A1 | 7/2006 | Takao | | EP | 1018697 A | 7/2000 |
| 2006/0170528 A1 | 8/2006 | Fukushige et al. | | EP | 1 139 301 A2 | 10/2001 |
| 2006/0187200 A1* | 8/2006 | Martin ........................... 345/156 | | EP | 1 531 419 A2 | 5/2005 |
| 2006/0210082 A1 | 9/2006 | Devadas et al. | | EP | 1533759 A1 | 5/2005 |
| 2006/0214512 A1 | 9/2006 | Iwata | | EP | 1538548 A2 | 6/2005 |
| 2006/0239514 A1 | 10/2006 | Watanabe et al. | | EP | 1624399 B1 | 2/2006 |
| 2006/0249008 A1* | 11/2006 | Luther ............................ 84/602 | | EP | 1939788 A1 | 7/2008 |
| 2006/0259873 A1 | 11/2006 | Mister | | GB | 2 331 613 A | 5/1999 |
| 2006/0261174 A1 | 11/2006 | Zellner et al. | | JP | 04158434 A2 | 6/1992 |
| 2006/0271793 A1 | 11/2006 | Devadas et al. | | WO | WO 90/03620 A1 | 4/1990 |
| 2006/0287963 A1 | 12/2006 | Steeves et al. | | WO | WO 98/58342 A | 12/1998 |
| 2007/0031011 A1 | 2/2007 | Erhart et al. | | WO | WO 99/28701 A | 6/1999 |
| 2007/0036400 A1 | 2/2007 | Watanabe et al. | | WO | WO 99/43258 A | 9/1999 |
| 2007/0057763 A1 | 3/2007 | Blattner et al. | | WO | WO 01/22349 A | 3/2001 |
| 2007/0067828 A1 | 3/2007 | Bychkov | | WO | WO 01/94902 A | 12/2001 |
| 2007/0076926 A1 | 4/2007 | Schneider et al. | | WO | WO 01/94902 A3 | 12/2001 |
| 2007/0076951 A1 | 4/2007 | Tanaka et al. | | WO | WO 02/47018 A2 | 6/2002 |
| 2007/0086634 A1 | 4/2007 | Setlak et al. | | WO | WO 02/47018 A3 | 6/2002 |
| 2007/0090312 A1 | 4/2007 | Stallinga et al. | | WO | WO 02/061668 A | 8/2002 |
| 2007/0138299 A1 | 6/2007 | Mitra | | WO | WO 02/077907 A1 | 10/2002 |
| 2007/0198141 A1* | 8/2007 | Moore ............................. 701/3 | | WO | WO 03/063054 A2 | 7/2003 |
| 2007/0198435 A1 | 8/2007 | Siegal et al. | | WO | WO 03/075210 A2 | 9/2003 |
| 2007/0228154 A1 | 10/2007 | Tran | | WO | WO 2004/066194 A1 * | 5/2004 |
| 2007/0237366 A1 | 10/2007 | Maletsky | | WO | WO 2004/066194 A1 | 8/2004 |
| 2007/0248249 A1 | 10/2007 | Stoianov | | WO | WO 2004/066693 A1 | 8/2004 |
| 2008/0002867 A1 | 1/2008 | Mathiassen et al. | | WO | WO 2005/106774 A2 * | 4/2005 |
| 2008/0013805 A1 | 1/2008 | Sengupta et al. | | WO | WO 2005/104012 A1 | 11/2005 |
| 2008/0019578 A1 | 1/2008 | Saito et al. | | WO | WO 2005/106774 A2 | 11/2005 |
| 2008/0049987 A1 | 2/2008 | Champagne et al. | | WO | WO 2005/106774 A3 | 11/2005 |
| 2008/0049989 A1 | 2/2008 | Iseri et al. | | WO | WO 2006/041780 A1 | 4/2006 |
| 2008/0063245 A1 | 3/2008 | Benkley et al. | | WO | WO 2007/011607 A1 | 1/2007 |
| 2008/0126260 A1 | 5/2008 | Cox et al. | | WO | WO 2008/033264 A2 | 3/2008 |
| 2008/0169345 A1 | 7/2008 | Keane et al. | | WO | WO 2008/033264 A3 | 3/2008 |
| 2008/0170695 A1 | 7/2008 | Adler et al. | | WO | WO 2008/033265 A2 | 6/2008 |
| 2008/0175450 A1 | 7/2008 | Scott et al. | | WO | WO 2008/033265 A3 | 6/2008 |
| 2008/0178008 A1 | 7/2008 | Takahashi et al. | | WO | WO 2008/137287 A1 | 11/2008 |
| | | | | WO | WO 2009/002599 A2 | 12/2008 |

| | | |
|---|---|---|
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 | 5/2011 |

OTHER PUBLICATIONS

Search Report Mailed Sep. 8, 2005 for International Application No. PCT/US2005/012792.

Search Report Mailed Dec. 12, 2005 for International Application No. PCT/US2005/013943.

Search Report Mailed Dec. 22, 2005 for European Application No. EP 05021634.0-2218.

Davide Maltoni, "*Handbook of Fingerprint Recognition*", XP002355942 Springer, New York, USA, Jun. 2003, pp. 65-69.

Vermesan et al., "*A 500-dpi AC Capacitive Hybrid Flip-Chip CMOS ASIC/Sensor Module for Fingerprint, Navigation, and Pointer Detection With On-Chip Data Processing*", IEEE Journal of Solid State Circuits, vol. 38, No. 12, Dec. 2003, pp. 2288-2294.

International Search Report and Written Opinion mailed Jan. 30, 2006 for Application No. PCT/US2005/035504.

Matsumoto et al., Impact of Artificial "Gummy" Fingers on Fingerprint Systems, SPIE 4677 (2002), reprinted from cryptome.org.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] pp. 127-134, paragraph 6.2.

Gassend, et al., "Controlled Physical Random Functions", In Proceedings of the 18th Annual Computer Security Conference, Las Vegas, Nevada, Dec. 12, 2002.

\* cited by examiner

METHODS AND APPARATUS FOR ACQUIRING A SWIPED FINGERPRINT IMAGE

CROSS-REFERENCE TO RELATED APPLICATION

This application claims the benefit of Provisional Application Ser. No. 60/564,791, filed Apr. 23, 2004, which is hereby incorporated by reference in its entirety.

FIELD OF THE INVENTION

This invention relates to systems and methods for electronically sensing biometric features of an object, such as a fingerprint. More particularly, the invention relates to methods and apparatus for assisting a user of a fingerprint sensing system wherein a fingerprint image is acquired by swiping a finger over an image sensor.

BACKGROUND OF THE INVENTION

Electronic fingerprint sensing has received increased attention as a technique for reliable identification of individuals. Electronic fingerprint sensing may be used in stationary equipment, such as security checkpoints, and in portable devices, such as mobile phones and other wireless devices, and smart cards. Accordingly, electronic fingerprint sensing systems are required to be compact, highly reliable and low in cost.

Various electronic fingerprint sensing methods have been proposed. Known methods include optical sensing and capacitive sensing with a two-dimensional array of electrodes.

Capacitive fingerprint sensing using a swiped finger technique is disclosed in International Publication No. WO 02/47018, to Benkley for "Swiped Aperture Capacitive Fingerprint Sensing Systems and Methods," published Jun. 13, 2002. Conductive elements, or plates, are formed on an insulating substrate to create a linear one-dimensional capacitive sensing array for detecting topographic variations in an object, such as a finger. The linear array includes multiple drive plates which are sequentially excited with short duration electronic waveform bursts. An orthogonal pickup plate connected to a charge sensing circuit sequentially detects the intensity of the electric field created by each drive element. With each complete scan of the drive plates, a linear one-dimensional slice of the fingerprint is acquired. By swiping a finger across the gap between the drive plates and the pickup plate, and scanning the gap at a much faster rate than the swipe speed, a two-dimensional image based on capacitance can be produced. The image represents the fingerprint.

Training a user to properly swipe his or her finger across the image sensor remains an impediment to adoption of these devices. In order to acquire a useful fingerprint image, the user must position the finger on the sensor area and keep the finger substantially flat while swiping the finger over the image sensor within an acceptable range of speeds.

SUMMARY OF THE INVENTION

According to a first aspect of the invention, a method is provided for assisting a user of a fingerprint sensing system. The method comprises sensing a position of a user's finger relative to a swiped fingerprint image sensor, and providing to the user, in response to the sensed finger position, an indication of finger placement relative to the fingerprint image sensor.

The indication of finger placement may comprise a display of actual finger placement and desired finger placement. The indication of finger placement may be provided on a visual display device, such as a computer monitor. The indication of finger placement may include a visual cue to start a swipe of the user's finger when the actual finger placement matches the desired finger placement.

The position of the user's finger may be sensed with a finger position sensor. An angle of the user's finger relative to the sensor may be determined from start and end positions of the user's finger on the sensor. The angle of the user's finger relative to the finger position sensor may be displayed to assist the user in moving to the desired finger placement.

The indication of finger placement may include a visual display of finger placement, an audible indication of finger placement, or both. The visual display may be provided on a computer monitor or by a series of display lights, such as light-emitting diodes. In one embodiment, the display of finger placement on the computer monitor comprises a side view of finger placement relative to the fingerprint image sensor. In another embodiment, the display of finger placement on the computer monitor comprises a top view of finger placement relative to the fingerprint image sensor.

According to a second aspect of the invention, a fingerprint sensing system is provided. The fingerprint sensing system comprises an image sensor to sense ridge peaks and ridge valleys of a fingerprint on a moving finger, a finger position sensor to sense a position of the finger relative to the image sensor, and processing apparatus to provide to a user, in response to the sensed finger position, an indication of finger placement relative to the image sensor.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
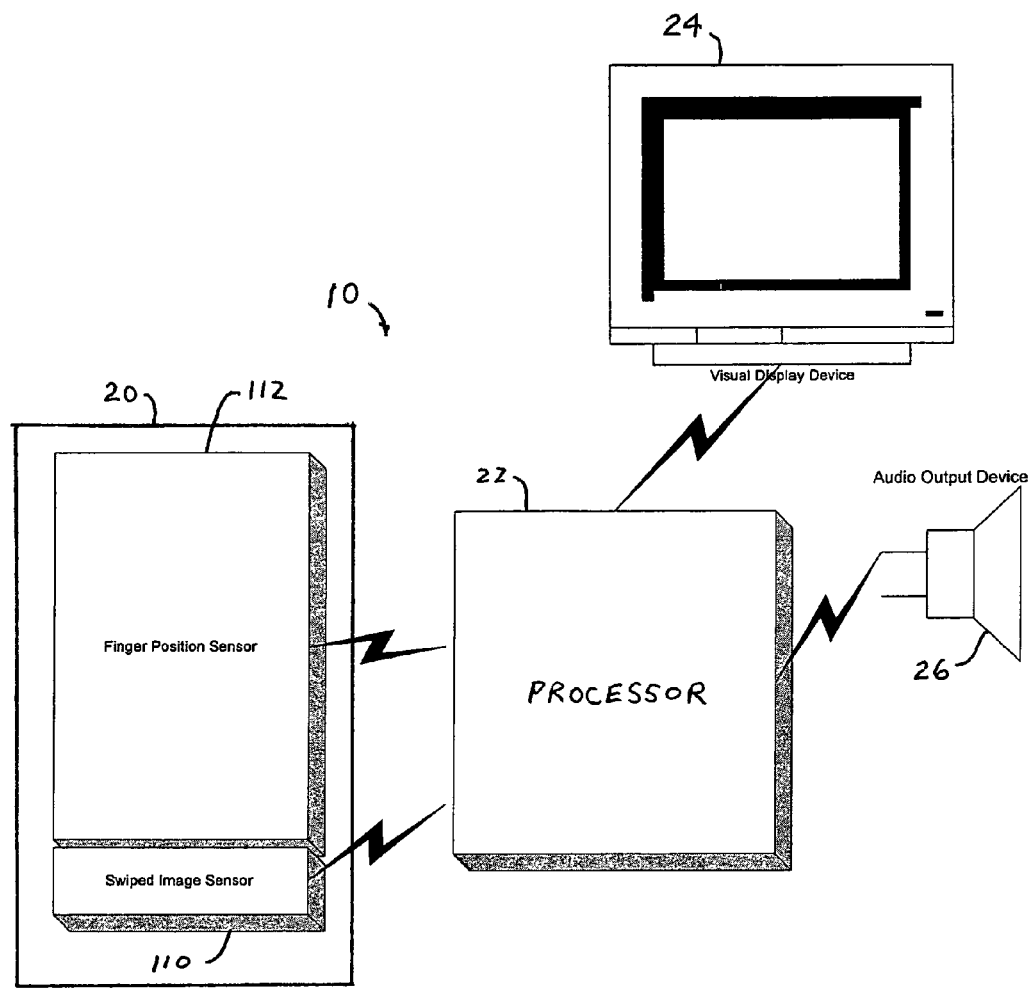
FIG. 1 is a block diagram of a fingerprint sensing system according to a first embodiment of the invention.
Figure 2:
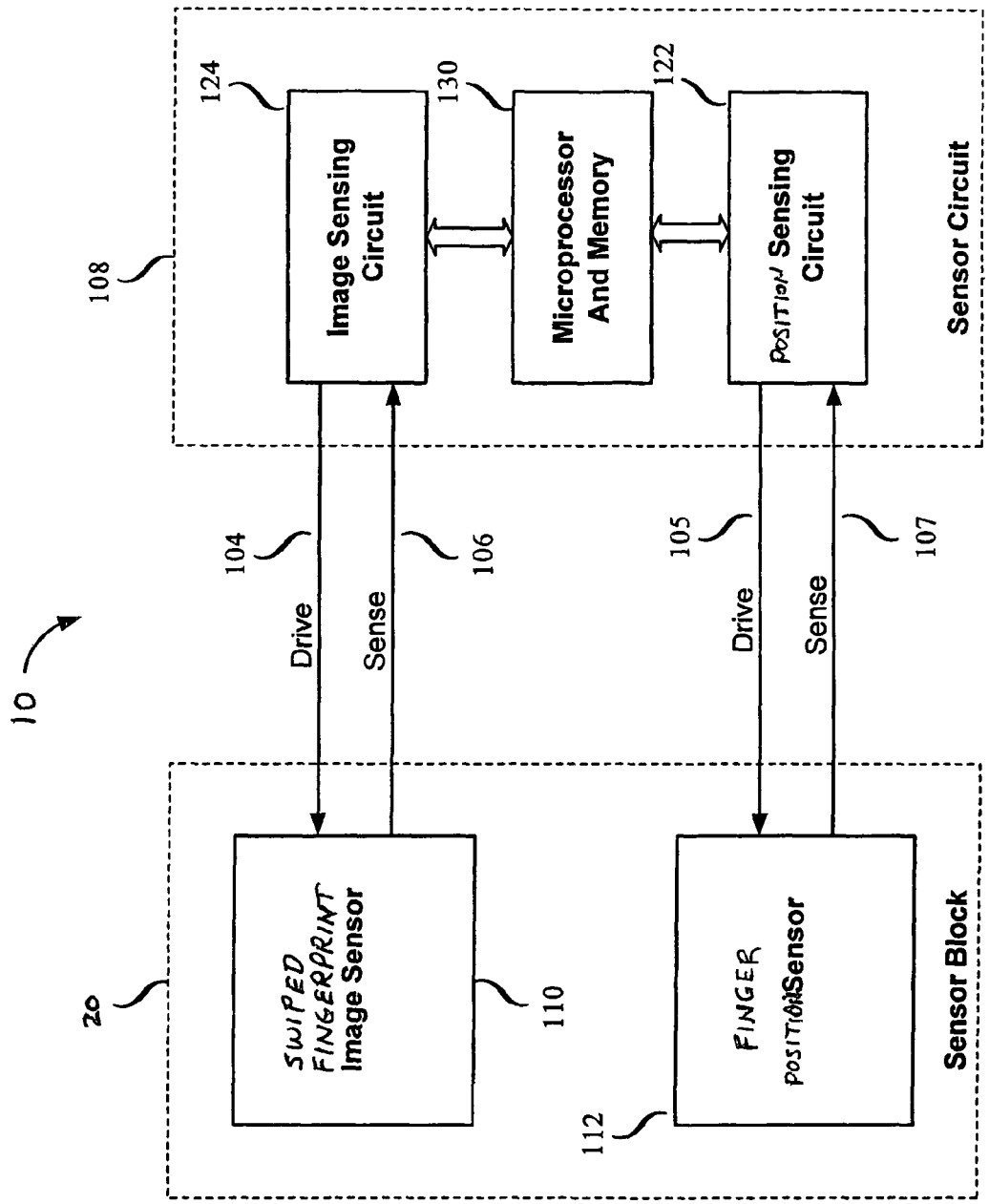
FIG. 2 is a block diagram of a sensing portion of the fingerprint sensing system of FIG. 1.

A fingerprint sensing system 10 in accordance with a first embodiment of the present invention is shown in FIG. 1. A sensing portion of the system is shown in FIG. 2. As shown in FIG. 1, fingerprint sensing system 10 may include a sensor block 20, a processor 22, a visual display device 24 and an audio output device 26. The visual display device 24 may be a computer monitor, for example, in this embodiment. As shown in FIG. 2, sensor block 20 receives drive signals from and delivers sense signals to a sensor circuit 108. Sensor circuit 108 may be part of processor 22 shown in FIG. 1.

Sensor block 20 includes a swiped fingerprint image sensor 110 and a finger position sensor 112. Image sensor 110 and finger position sensor 112 may be fabricated on a single substrate as described below. Sensor circuit 108 includes an image sensing circuit 124, a position sensing circuit 122 and a microprocessor and memory 130. Image sensor 110 receives drive signals 104 from and delivers sense signals 106 to image sensing circuit 124. Position sensor 112 receives drive signals 105 from and delivers sense signals 107 to position sensing circuit 122. Microprocessor and memory 130 acquires and processes image data and finger position data and controls operation of the system. The components of fingerprint sensing system 10 are described below.

Figure 3:
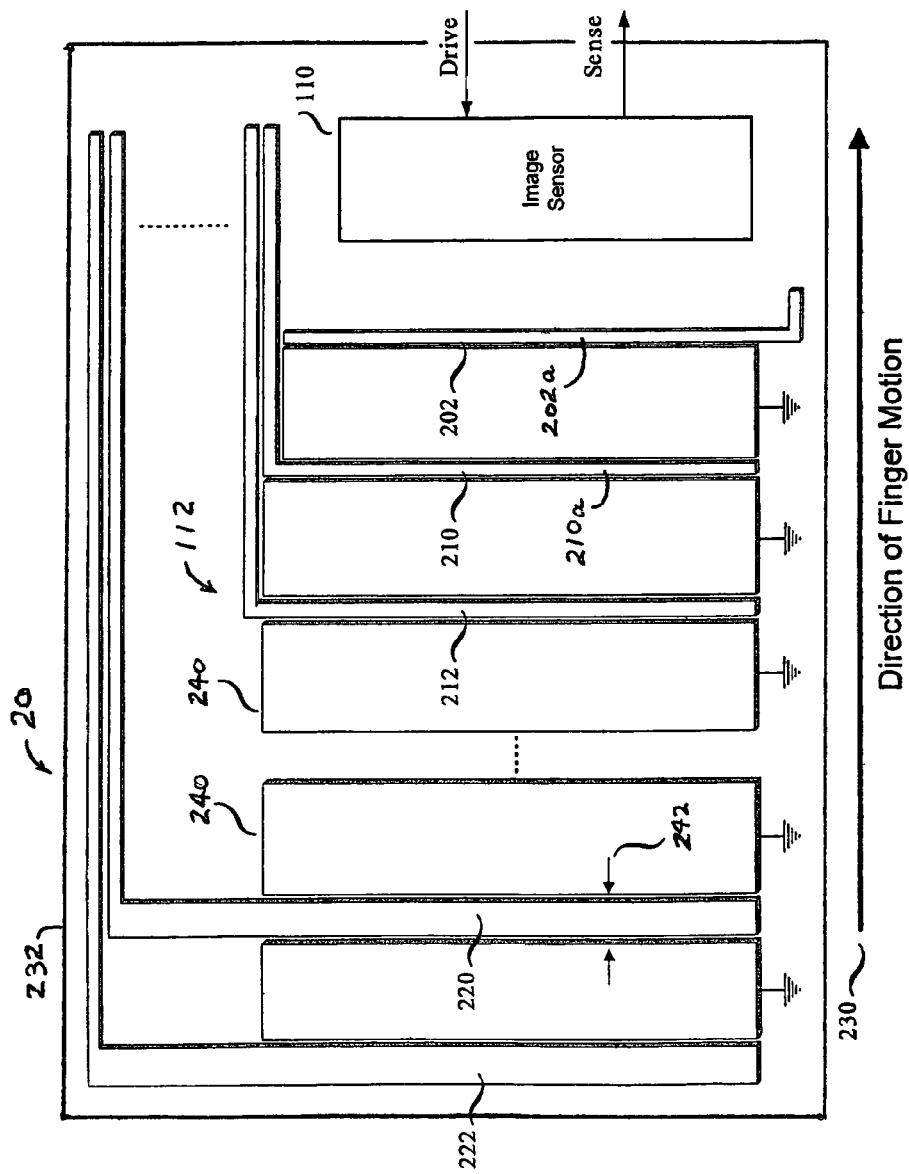
FIG. 3 shows an example of a finger position sensor that may be utilized in the fingerprint sensing system of FIG. 1.

An embodiment of sensor block 20 is shown in FIG. 3. In the embodiment of FIG. 3, finger position sensor 112 includes a position pickup plate 202 and multiple position drive plates 210, 212, . . . 220 and 222. An expected direction of finger motion across sensor block 20 is indicated by arrow 230. Pickup plate 202 and drive plates 210, 212, . . . 220 and 222 may be conductive traces on a substrate 232. A sensing portion 202a of pickup plate 202 is a straight conductor that is disposed generally orthogonally with respect to the expected direction of finger motion. In addition, drive plates 210, 212, . . . 220 and 222 may include sensing portions (such as sensing portion 210a) that are straight conductors disposed generally orthogonally with respect to the expected direction of finger motion.

The drive plates 210, 212, . . . 220 and 222 are spaced from pickup plate 202 by progressively increasing distances. Thus, for example, drive plate 212 is spaced from pickup plate 202 by a greater distance than drive plate 210. Adjacent drive plates may be equally spaced. However, equal spacing between adjacent drive plates is not required. The drive plates 210, 212, . . . 220 and 222 are dimensioned and spaced from pickup plate 202 to sense the bulk of a finger rather than fingerprint features. Thus, the spacing between each drive plate and the pickup plate may be greater than about two times the typical spacing between ridge peaks and ridge valleys of a fingerprint.

In operation, drive plates 210, 212, . . . 220 and 222 are energized sequentially with signal bursts supplied by position sensing circuit 122 (FIG. 1). The signal bursts are coupled to pickup plate 202 and are detected by position sensing circuit 122. In the case where a finger is in contact or near contact with the energized drive plate and the pickup plate, the signal burst is conducted through the bulk of the finger to the pickup plate. In the case where the finger is not in contact with the energized drive plate, the signal burst is conducted through air to the pickup plate, and a much smaller signal is detected. Thus, the sensed signal level indicates whether the finger is in contact with the energized drive plate and the pickup plate. By analyzing the detected signals from all of the drive plates, the position of the finger end can be determined. The finger may contact more than one of the drive plates at a given time. However, the last drive plate in contact with the finger indicates the position of the finger end.

In the embodiment of FIG. 3, ground plates 240 are positioned between adjacent drive plates and between drive plate 210 and pickup plate 202. Each of ground plates 240 may be connected to ground or to another reference potential. In addition, a width 242 of the sensing portion of drive plates 210, 212, . . . 220 and 222 increases with distance from pickup plate 202. The increased widths of the position drive plates compensates, at least in part, for the reduced signal coupling from drive plates that are more distant from pickup plate 202.

It will be understood that different types of finger position sensors may be utilized within the scope of the invention. Additional finger position sensors are disclosed in the aforementioned International Publication No. WO 02/47018, which is hereby incorporated by reference. The disclosed finger position sensors include a plurality of individual finger detectors spaced apart along an expected direction of finger motion.

Figure 4:
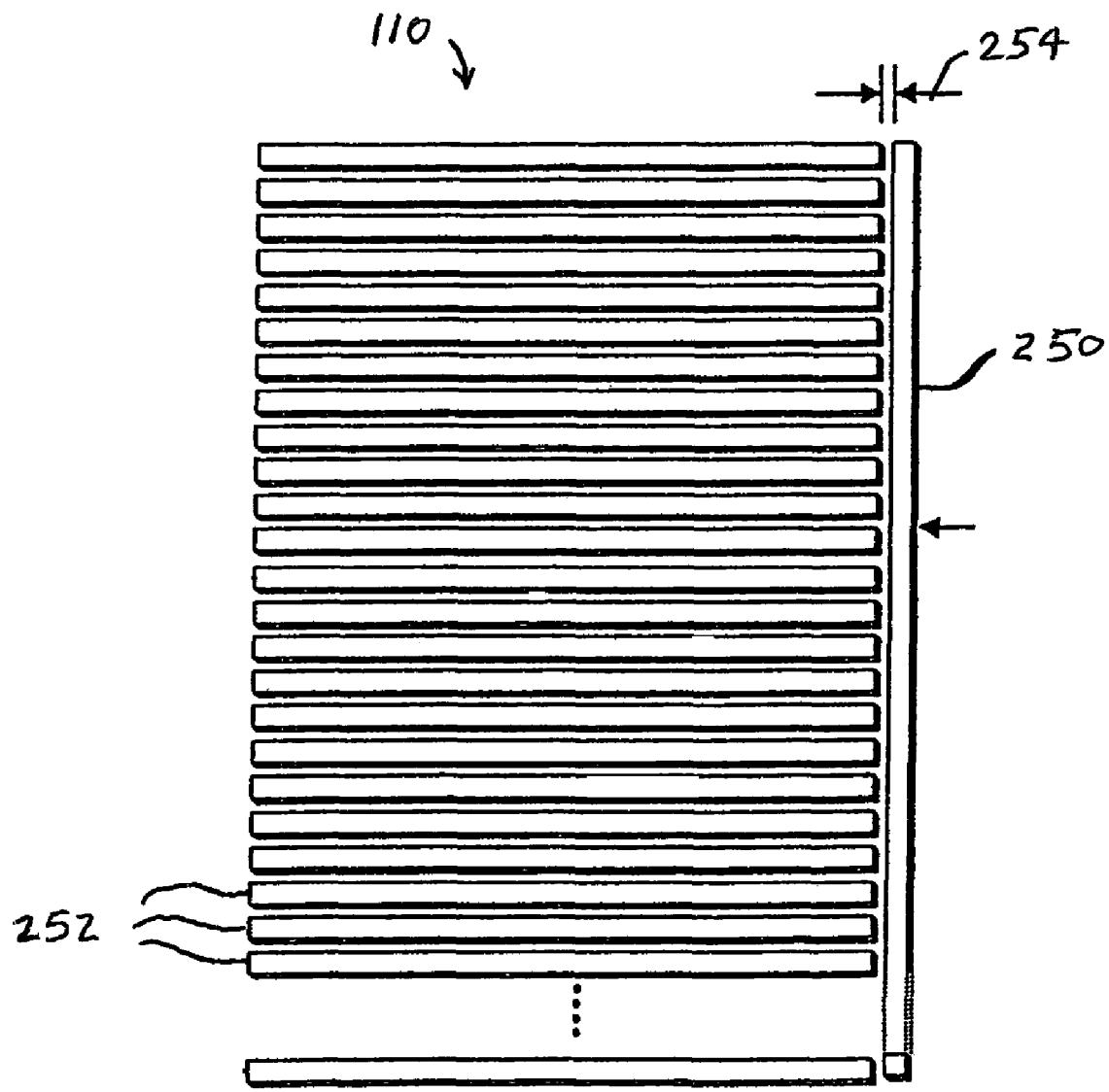
FIG. 4 shows an example of a swiped fingerprint image sensor that may be utilized in the fingerprint sensing system of FIG. 1.

An embodiment of image sensor 110 is shown in FIG. 4. Image sensor 110 includes capacitive image pickup plate 250 disposed generally orthogonally with respect to the expected direction of movement of the finger, and a plurality of image drive plates 252 in spaced relation to the image pickup plate 250 to define a plurality of capacitive sensor gaps 254 between respective image drive plates and the image pickup plate in a line generally orthogonally with respect to the expected direction of movement of the finger. Ridge peaks and ridge valleys of the fingerprint passing over this linear array of capacitive sensor gaps 254 produce a change in capacitance between respective image drive plates 252 and image pickup plate 254. The image drive plates 252 are energized sequentially with signal bursts supplied by image sensing circuit 124 (FIG. 2). The signal bursts are capacitively coupled to image pickup plate 250 and are detected by image sensing circuit 124 to provide a linear slice of the fingerprint image. Additional details regarding image sensors are disclosed in the aforementioned International Publication No. WO 02/47018. It will be understood that different image sensors may be utilized within the scope of the invention. For example, the image sensor may be a segmented image sensor that acquires several lines of a fingerprint image simultaneously.

As indicated above, a swiped fingerprint image sensor acquires a fingerprint image as the user swipes his or her finger across the image sensor. The swiped image sensor acquires lines of the fingerprint image and the finger position sensor senses finger position as the finger is swiped across the image sensor. The fingerprint image is constructed by combining the image lines using the sensed finger positions to determine finger speed and hence the required spacing between image lines. In order to acquire a good quality image, the user must position his or her finger at an appropriate initial position on the sensor and must keep the finger relatively flat on the sensor while swiping the finger at an acceptable rate of speed over the image sensor.

According to an aspect of the invention, the fingerprint sensing system provides assistance to the user in positioning and swiping the finger. The user's finger position is sensed by the finger position sensor 112, and information concerning finger placement is provided to the user. The information may be visual, audible, or both. In some embodiments, the system provides an indication of finger placement on a video display screen. The indication of finger placement may include an indication of an actual finger placement and a desired finger placement. When the actual finger placement is sufficiently close to the desired finger placement, the system may provide a cue that the finger may be swiped over the image sensor. The cue may be visual, such as a flashing indicator, audible, such as a tone, or both. If the finger is not suitably placed on the image sensor, the system may provide corrective assistance to the user. For example, the system may display an arrow showing the direction of finger movement toward the desired finger placement. In other embodiments, the system may provide a prompt in the form of a text message that indicates an action to be taken. In each case, the user receives feedback that assists in use of the fingerprint sensing system.

The finger position sensor shown in FIG. 3 and described above relies on finger contact with the position pickup plate and one or more of the position drive plates. Accordingly, the finger is substantially flat against the position sensor of FIG. 3 during position sensing. The last drive plate in contact with the finger indicates the position of the fingertip.

The finger position sensors disclosed in International Publication No. WO 02/47018 utilize individual finger detectors. A finger placed on the finger position sensor may be in contact with some or all of the finger detectors. The last finger detector in contact with the finger indicates the position of the fingertip. The number of finger detectors in contact with the finger indicates whether the finger is flat on the sensor or is tilted at an angle. A finger that is flat on the position sensor covers a larger number of finger detectors than a fingertip contacting the sensor. Thus, in position sensors which utilize individual finger detectors, the number of finger detectors in contact with the finger can be used to estimate whether the finger is flat against the position sensor or is tilted at an angle with respect to the position sensor. A large number of finger detectors in contact with the finger indicates that the finger is flat on the position sensor, whereas a small number of finger detectors in contact with the finger indicates that the finger is tilted at an angle with respect to the position sensor.

Examples of finger position displays which may be utilized to assist a user of the fingerprint sensing system are shown in FIGS. 5-11. The finger position displays may be generated by processor 22 (FIG. 1) in response to the sensed finger position from finger position sensor 112 and may be displayed on visual display device 24. The displays of FIGS. 5-11 are side views of sensor block 20 and a user's finger. It will be understood that these finger position displays are given by way of example only and are not limiting as to the scope of the invention.

The displays of FIGS. 5-11 indicate actual finger placement when the finger is partially lifted, or tilted at an angle, from the sensor block. The finger position sensors disclosed in International Publication No. WO 02/47018 provide information when the finger is partially lifted and thus are suitable for use in the embodiments of FIGS. 5-11.

Figure 5:
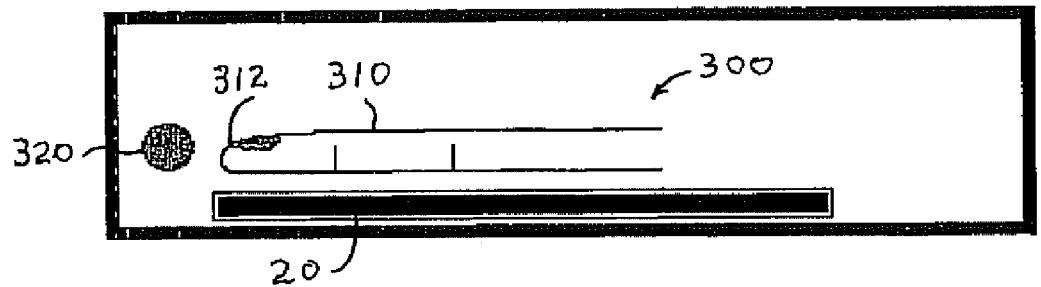
FIG. 5 illustrates a display of desired finger position generated by the processor on the visual display device.

Referring to FIG. 5, a finger position display 300 shows sensor block 20 and a desired finger placement 310. The desired finger placement 310 is flat against sensor block 20, with the fingertip 312 located at the left side of sensor block 20. Desired finger placement 310 represents the initial finger placement to begin a swipe for fingerprint acquisition. Finger position display 300 may further include a simulated light or other indicator 320 which may be activated in response to correct finger placement. The finger position display 300 of FIG. 5 shows a desired finger placement but does not show the user's finger.

Figure 6:
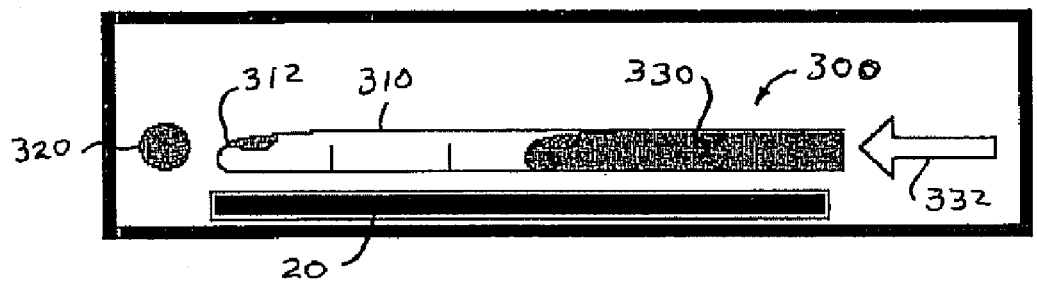
FIG. 6 illustrates a display of desired finger position and actual finger position generated by the processor on the visual display device.

FIG. 6 shows finger position display 300 after a user has placed his or her finger on sensor block 20. An actual finger placement 330 is shown in the position display. Actual finger placement 330 is determined from the finger position sensor 112 as described above. Actual finger placement 330 illustrates finger placement in relation to sensor block 20 and desired finger placement 310. Position display 300 may further include an arrow 332 to indicate the required direction of finger movement toward the desired finger placement. In the display of FIG. 6, indicator 320 remains inactive.

Figure 7:
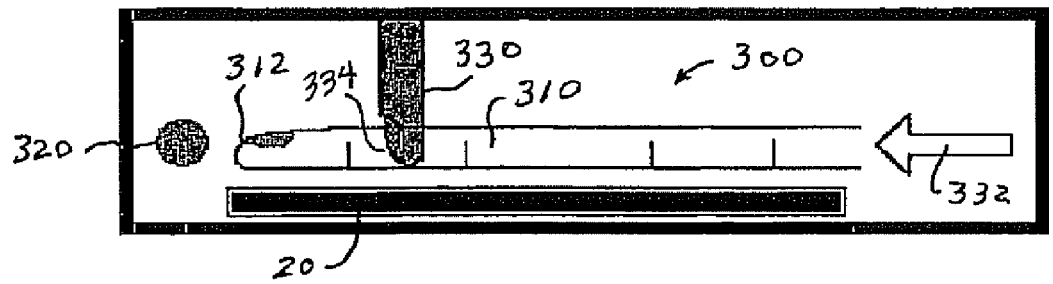
FIG. 7 illustrates a display of desired finger position and actual finger position, with the finger lifted and a small sensor area covered.

Referring to FIG. 7, actual finger placement 330 is indicated by a finger nearly perpendicular to sensor block 20, with fingertip 334 in contact with sensor block 20 to the right of desired finger placement 310. As discussed above, the approximate angle of actual finger placement 330 may be determined from the number of finger detectors in contact with the user's finger. The display of FIG. 7 indicates that the user's finger must be placed flat against sensor block 20 and moved to the left in order to match desired finger placement 310.

Figure 8:
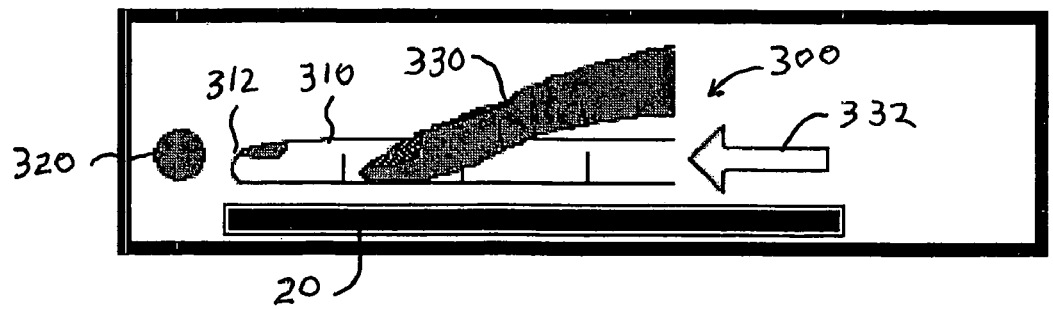
FIG. 8 illustrates a display of desired finger position and actual finger position, with the finger lifted and a moderate sensor area covered.

Referring to FIG. 8, position display 300 shows an example of actual finger placement 330 at a small angle relative to sensor block 20 and to the right of desired finger placement 310. The small angle is determined from the fact that the user's finger is in contact with an intermediate number of finger detectors of the finger position sensor 112. As in the example of FIG. 7, the user's finger must be moved toward the left and placed flat against sensor block 20 in order to match desired finger placement 310.

Figure 9:
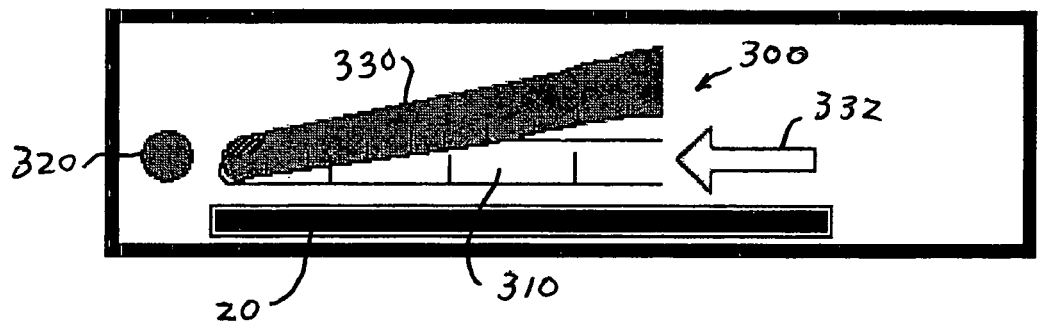
FIG. 9 illustrates a display of desired finger position and actual finger position, with the finger lifted and a small sensor area covered.

Referring to FIG. 9, position display 300 shows an example of actual finger placement 330 at the correct position on sensor block 20, but the user's finger is tilted at an angle relative to sensor block 20. By placing the finger flat against sensor block 20, the user matches desired finger placement 310.

Figure 10:
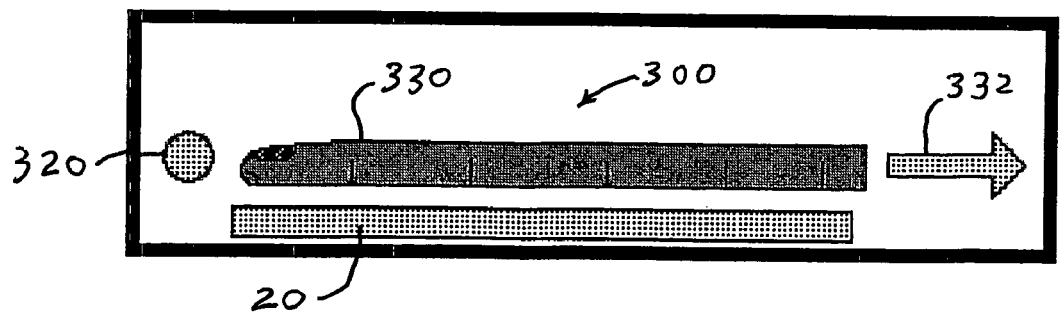
FIG. 10 illustrates a display of the finger in the desired position, with a visual cue to start a swipe.

Referring to FIG. 10, position display 300 shows an example of actual finger placement 330 that matches desired finger placement 310, and the finger swipe for fingerprint acquisition can begin. In the example of FIG. 10, indicator 320 is activated, such as by a flashing indicator, and arrow 332 is reversed to indicate the direction of finger swipe over sensor block 20.

Figure 11:
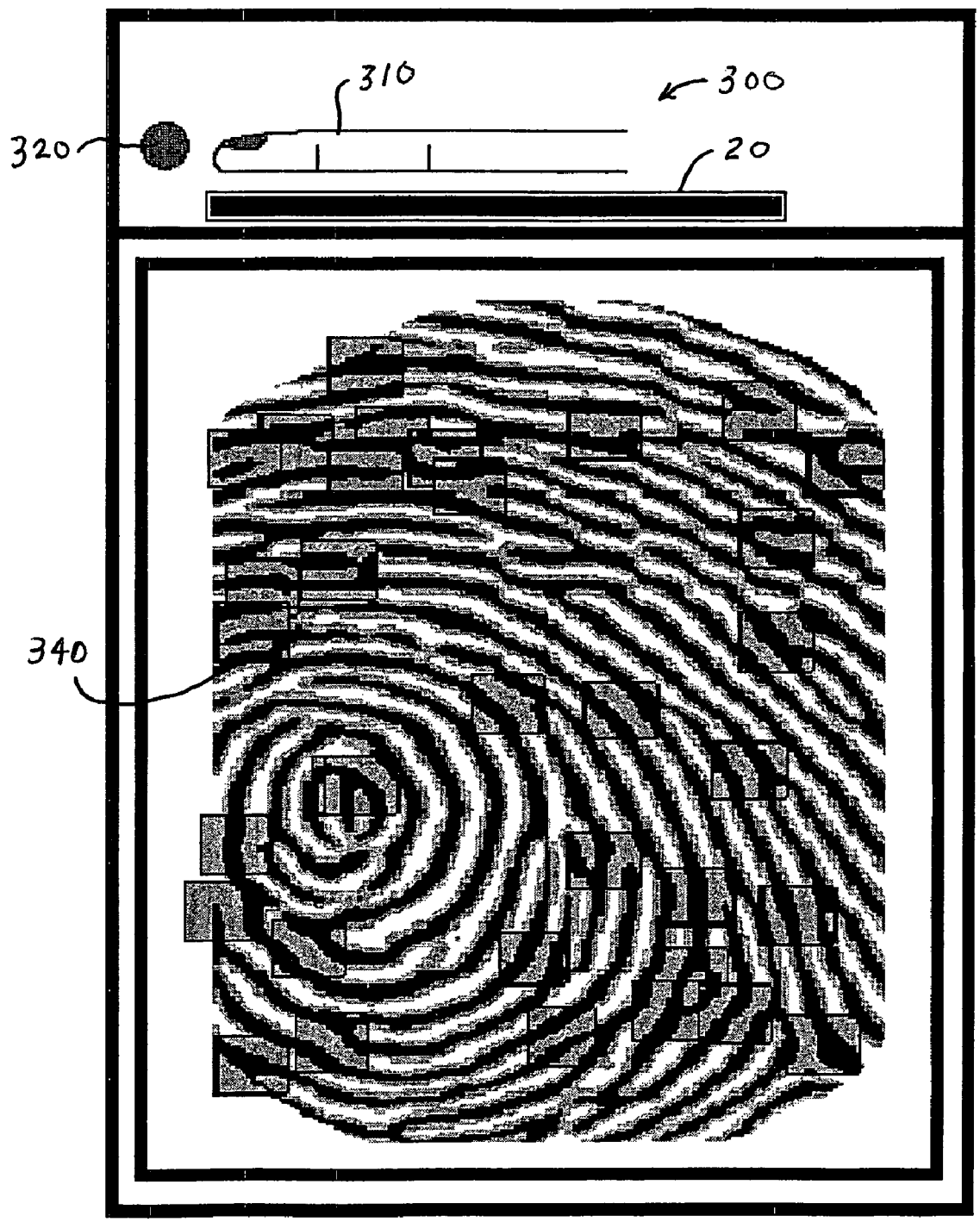
FIG. 11 illustrates a display of desired finger position and an acquired fingerprint.

An example of the display following fingerprint acquisition is shown in FIG. 11. An acquired fingerprint 340 may be displayed below finger position display 300 to confirm successful fingerprint imaging.

Figure 12A:
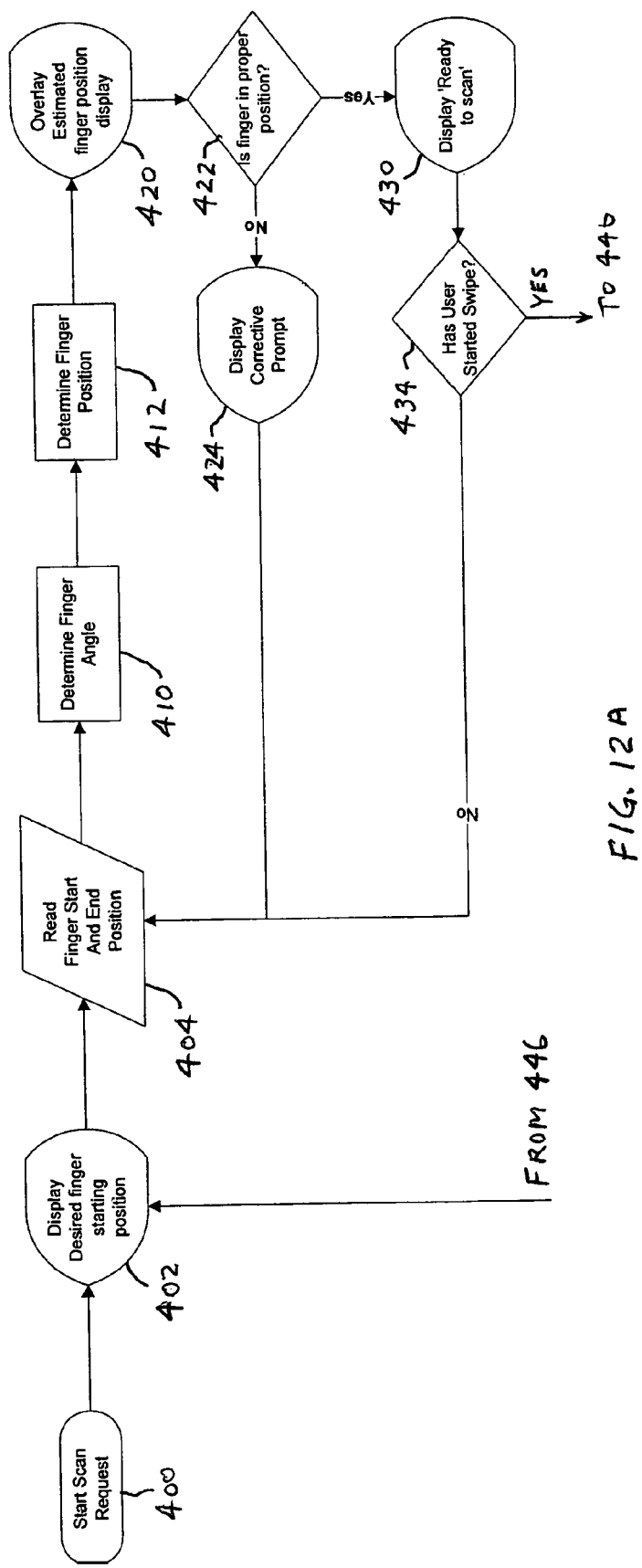
FIGS. 12A and 12B are flow charts of a process for finger position sensing and display, and fingerprint acquisition.
Figure 12B:
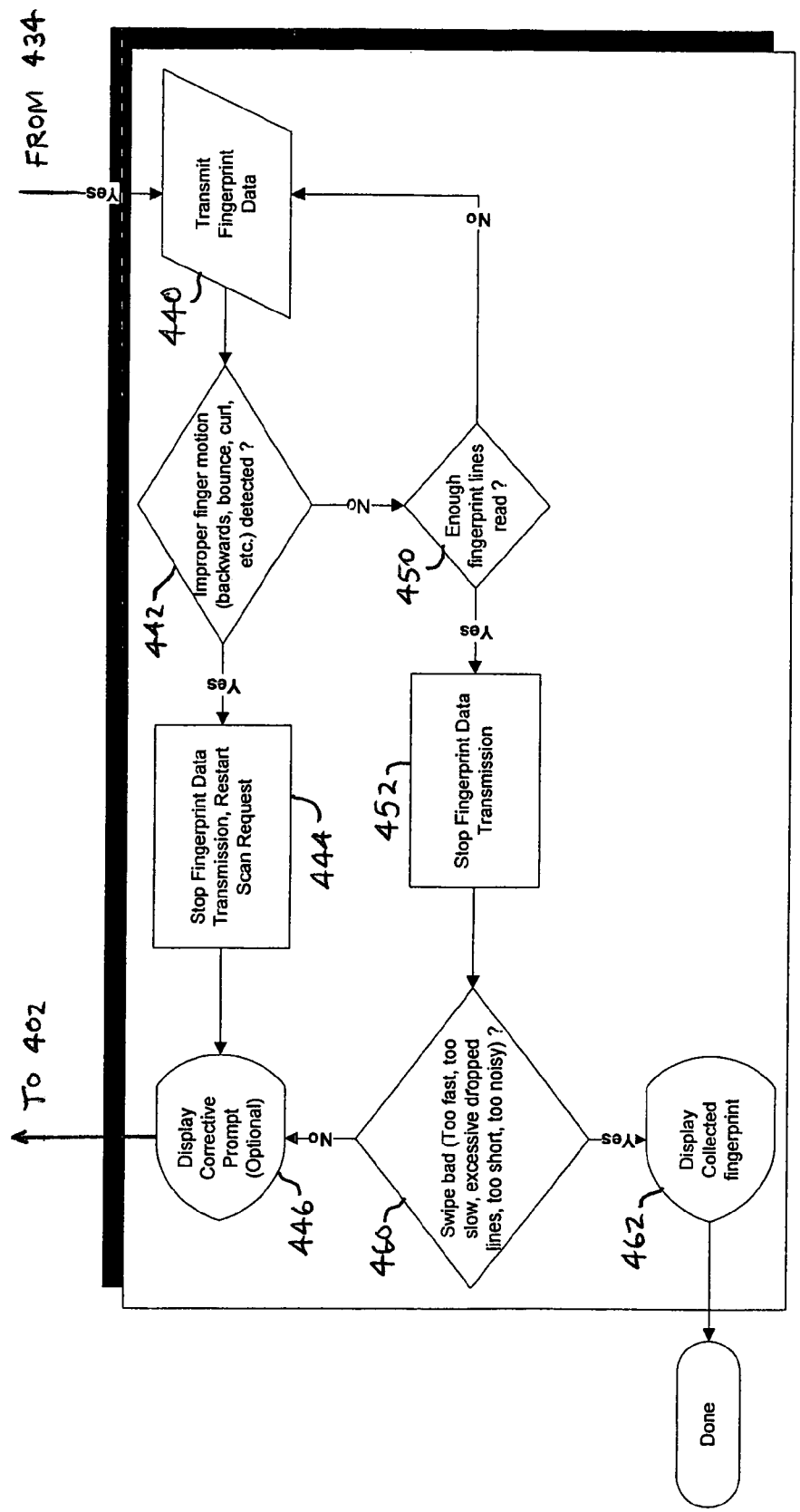

A flow chart of a process for finger position sensing and display, and fingerprint acquisition in accordance with an embodiment of the invention is shown in FIGS. 12A and 12B. The process of FIGS. 12A and 12B may be executed by processor 22 shown in FIG. 1. The processor may execute instructions stored in a tangible machine readable medium such that the processor performs processes implementing methods as discussed in the present application, as an example as shown in the flow charts of FIGS. 12A and 12B.

The finger start and end positions are read from finger position sensor 112 in step 404. As discussed above, the finger start position indicates finger placement relative to sensor block 20 and the number of finger detectors in contact with the finger provides an estimate of finger angle. The finger angle is determined in step 410, and the finger position is determined in step 412. Then, the estimated actual finger position is overlaid on the finger position display 300 in step 420. The display of actual finger position corresponds to one of the examples of actual finger placement shown in FIGS. 6-10 and described above.

In step 422, a determination is made as to whether the finger is in the proper position for fingerprint acquisition. If the actual finger placement and the desired finger placement do not match, a corrective prompt may be displayed in step 424. In one example, arrow 332 shown in FIGS. 6-9 is a corrective prompt. Arrow 332 indicates the direction of finger movement toward the desired finger placement. In another example, the corrective prompt may be a text message on the visual display device 24. Examples of corrective prompts are given below. The process then returns to step 404 to read the finger start and end positions after adjustment.

If the finger is determined in step 422 to be properly positioned, a ready-to-scan indicator is displayed in step 430. As shown in FIG. 10, indicator 320 may be activated. In other examples, an audible tone may be generated by audio output device 26, or a text message may be displayed on visual display device 24. In step 434, a determination is made as to whether the user has started a finger swipe. The swipe may be determined from a change in finger position on position sensor 112. If the user has not started a finger swipe, the process returns to step 404 and finger position is determined again.

If the user has started a finger swipe, fingerprint acquisition is initiated. In step 440 (FIG. 12B), fingerprint data is acquired from image sensor 110 and is stored by processor 22. During transmission of fingerprint data, improper finger motion is detected in step 442. Improper finger motions may include reversal of the finger swipe, lifting of the finger from the sensor or a swipe that is not straight. If improper finger motion is detected in step 442, fingerprint data acquisition is stopped in step 444 and a corrective prompt is displayed in step 446. The corrective prompt may indicate to the user that fingerprint acquisition must be restarted. The process then returns to step 402.

If improper finger motion is not detected in step 442, a determination is made in step 450 as to whether sufficient fingerprint lines have been acquired. If sufficient fingerprint lines have not been acquired, the process returns to step 440 for transmission of additional fingerprint data. If sufficient fingerprint lines have been acquired, fingerprint data transmission is stopped in step 452.

A determination is made in step 460 as to whether the finger swipe was bad. For example, the finger swipe may be too fast, too slow, too short, or the fingerprint data may include dropped lines or may be too noisy. An acceptable range of finger swipe speed may be 2.5 to 14 centimeters per second, but the swipe speed is not limited to this range and may vary depending on the system configuration. If the finger swipe is determined to be bad, a corrective prompt is displayed in step 446, and the user is instructed to repeat the process. The process then returns to step 402. If the finger swipe is determined in step 460 to be acceptable, the fingerprint is displayed in step 462, as shown in FIG. 11. The fingerprint acquisition process is then complete.

As indicated above, the system may provide corrective prompts to the user in the form of text messages. Examples of corrective prompts are given in the following list. It will be understood that these corrective prompts are given by way of example only and are not limiting as to the scope of the invention. Additional or different corrective prompts may be utilized. In the following list, the meaning of the prompt is followed by the prompt itself (Meaning: Prompt).

1. put the finger down: Put your fingertip at the top of the finger guide and swipe down in a smooth motion.
2. the finger swipe is good: Good quality fingerprint
3. Stiction: Your finger got stuck. Please try again, and try to swipe down in a smooth motion.
4. Swipe too fast: You may have swiped too fast. Please try again and swipe a little slower.
5. Swipe too slow: You may have swiped too slowly. Please try again, and try to swipe down a little faster.
6. Fingerprint too short: The fingerprint is too short to use, please try again. Put your fingertip at the top of the finger guide. Also, swipe a little slower.
7. Finger went backwards: Your finger went backwards. Please try again, and try to swipe down in a smooth motion.
8. Finger lifted during swipe: You may have lifted your finger. Please try again, and try to swipe down without lifting it.
9. Fingerprint too short: The fingerprint is too short, please try again. Put your fingertip at the top of the finger guide. Also, swipe a little slower.
10. Too few features to use: The fingerprint has too few features. Please try again. Put your fingertip at the top of the finger guide. Also, swipe a little slower and with a smooth motion.
11. Fingerprint was poor quality: Low-quality swipe detected. Please try again. Put your fingertip at the top of the finger guide. Also, swipe a little slower and with a smooth motion.
12. Too many dropped lines: Too many lines were dropped to use this fingerprint. Please try again.
13. Print too short to Enroll: This fingerprint is too small for enrollment. Please try again. Put your fingertip near the top and swipe slower.
14. Some rate lines bad: Some rate sensor columns were bad. Your Validity fingerprint sensor may need to be replaced if this error persists.
15. Some image lines bad: Some image sensor columns were bad. Your Validity fingerprint sensor may need to be replaced if this error persists.

Figure 13:
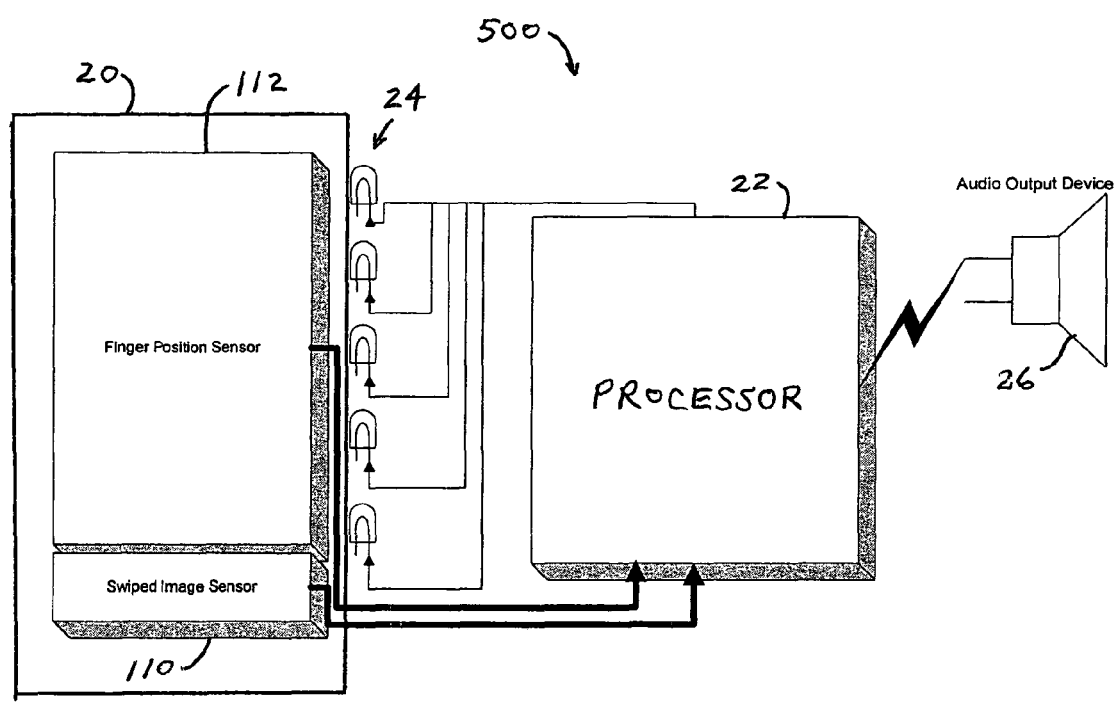
FIG. 13 is a block diagram of a fingerprint sensing system according to a second embodiment of the invention.

A fingerprint sensing system 500 in accordance with a second embodiment of the present invention is shown in FIG. 13. Like elements in FIGS. 1 and 13 have the same reference numerals. The fingerprint sensing system 500 differs from the fingerprint sensing system 10 in that the visual display device 24 is implemented as display lights, such as light-emitting diodes 510, 512, 514, 516 and 518. The light-emitting diodes 510-518 may be positioned in a row adjacent to sensor block 20 and may provide an indication of finger placement. It will be understood that a larger number of light-emitting diodes may be utilized within the scope of the present invention. The embodiment utilizing display lights provides a low cost alternative to the computer monitor in the embodiment of FIG. 1.

The light-emitting diodes are amber next to areas where finger contact is desired, and then are switched to green as finger contact is detected. When finger contact is complete and the finger is properly positioned to begin a swipe, the light-emitting diodes begin to scan in a moving pattern, with all the light-emitting diodes brightly lit expect one at any given time. The scan sequence moves the position of the dark light-emitting diode in the direction of swipe at the desired finger swipe speed. It will be understood that other colors may be utilized within the scope of the present invention.

In another embodiment, display lights are represented on the computer monitor adjacent to a visual representation of the finger swipe area. The display lights remain amber next to areas where finger contact is desired, and then are switched to green as finger contact is detected. When finger contact is complete and the finger is properly positioned to begin a swipe, the lights begin to scan in a moving pattern, with all the lights brightly lit except one at any given time. The scan sequence moves the position of the dark light in the direction of swipe at the desired finger swipe speed. Other colors and indicators may be utilized within the scope of the invention.

Figure 14:
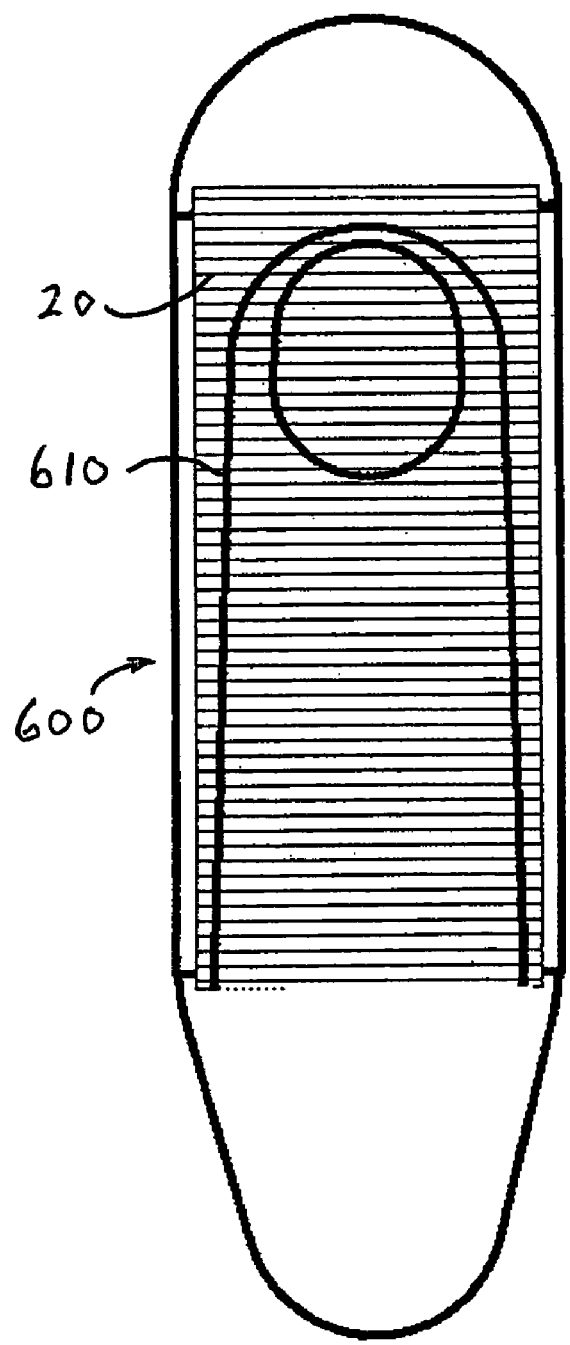
FIG. 14 illustrates a display of finger swipe area and desired finger placement in accordance with a third embodiment of the invention.
Figure 15:
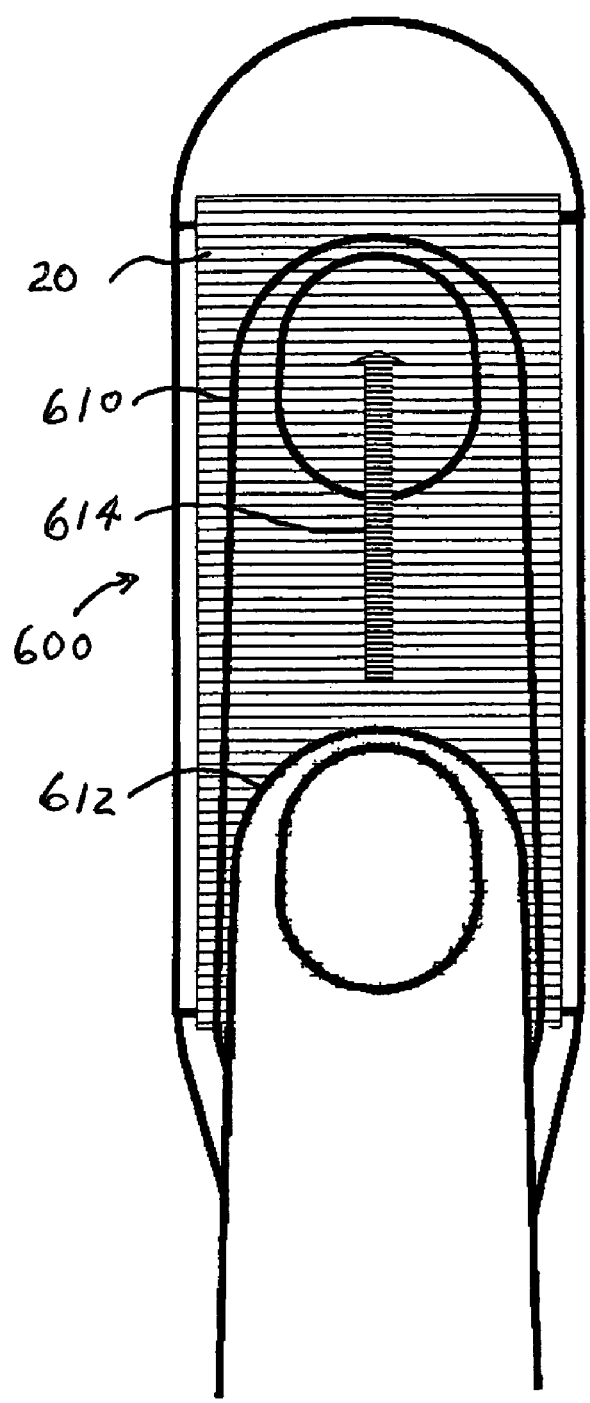
FIG. 15 illustrates a display of finger swipe area, desired finger placement and actual finger placement in the third embodiment.
Figure 16:
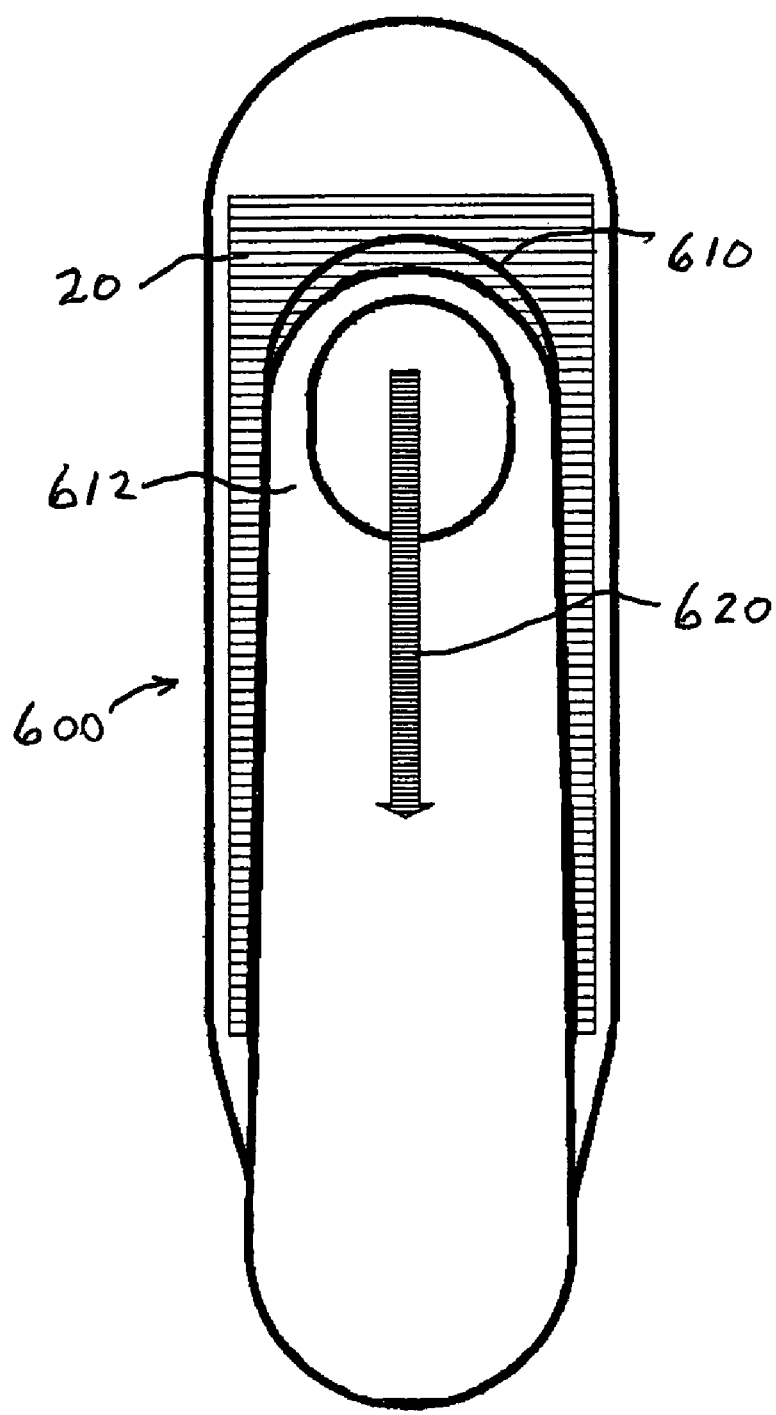
FIG. 16 illustrates a display of finger swipe area, actual finger placement and a visual cue to start a swipe in the third embodiment.

A further embodiment is described with reference to FIGS. 14-16. In the embodiment of FIGS. 14-16, a top view of the finger swipe area of the sensor as it appears to the user is generated on the computer monitor. As shown in FIG. 14, a finger position display 600 shows a representation of sensor block 20 overlaid by a finger having a desired finger placement 610 to begin a swipe of sensor block 20.

The embodiment of FIGS. 14-16 assumes that the user's finger is flat on the sensor block. Thus, this embodiment may utilize the finger position sensor shown in FIG. 3 and described above or the finger position sensors disclosed in International Publication No. WO 02/47018, but is not limited to these finger position sensors.

Referring to FIG. 15, an actual finger placement 612 is displayed in response to sensed finger position on sensor block 20. In the example of FIG. 15, the actual finger placement 612 is displaced from desired finger placement 610, and an arrow 614 indicates the direction of finger movement toward the desired finger placement 610.

Referring to FIG. 16, the finger position display 600 shows that the actual finger displacement 612 matches desired finger placement 610, and a downward arrow 620 provides a visual cue that the user may begin a finger swipe.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method comprising:
sensing, via a finger position sensing circuit, axially aligned to a direction of motion of a finger of a user during a swipe of the finger over a linear one-dimensional capacitive fingerprint image sensor array, a position of the finger of the user relative to the linear one-dimensional capacitive fingerprint image sensor array; and
providing to the user, in response to the position of the finger as sensed by the finger position sensing circuit, an indication whether the finger is properly positioned to begin a fingerprint image sensing swipe over the linear one-dimensional capacitive fingerprint image sensor array.

2. The method as defined in claim 1, wherein providing the indication comprises providing a visual display of the position of the finger relative to the linear one-dimensional capacitive fingerprint image sensor array.

3. The method as defined in claim 1, wherein providing the indication comprises displaying an actual finger placement and a desired finger placement.

4. The method as defined in claim 1, wherein the finger position sensing circuit determines a tilt angle of the finger of the user.

5. The method as defined in claim 4, wherein providing the indication includes displaying the tilt angle.

6. The method as defined in claim 1, wherein providing the indication comprises providing an audible indication of finger movement needed to correctly position the finger relative to the linear one-dimensional capacitive fingerprint image sensor array.

7. The method as defined in claim 1, wherein providing the indication comprises displaying an actual finger placement relative to the linear one-dimensional capacitive fingerprint image sensor on a computer monitor array.

8. The method as defined in claim 7, further comprising displaying a user prompt on the computer monitor.

9. The method as defined in claim 7, wherein displaying the actual finger placement on the computer monitor comprises displaying a side view of the actual finger placement relative to the linear one-dimensional capacitive fingerprint image sensor array.

10. The method as defined in claim 7, wherein displaying the actual finger placement on the computer monitor comprises displaying a top view of the actual finger placement relative to the linear one-dimensional capacitive fingerprint image sensor array.

11. The method as defined in claim 7, wherein displaying the actual finger placement on the computer monitor comprises displaying a visual cue to start the image sensing swipe.

12. The method as defined in claim 1, wherein providing the indication comprises indicating with light-emitting devices a finger movement needed to correctly position the finger relative to the linear one-dimensional capacitive fingerprint image sensor array.

13. The method as defined in claim 1, further comprising sensing the position of the finger of the user relative to the position of the linear one-dimensional capacitive fingerprint image sensor array multiple times during a swipe of the finger over the linear one-dimensional capacitive fingerprint image sensor array.

14. The method as defined in claim 13, further comprising determining swipe speed during the swipe of the finger over the linear one-dimensional capacitive fingerprint image sensor array.

15. The method as defined in claim 14, further comprising comparing the determined swipe speed with an allowable range of swipe speeds.

16. The method as defined in claim 14, further comprising generating a corrective prompt to the user if the determined swipe speed does not meet a predetermined criteria.

17. A fingerprint sensing system comprising:
a linear one dimensional capacitive fingerprint image sensor array configured to sense ridge peaks and ridge valleys of a fingerprint on a finger swiping over the linear one-dimensional capacitive fingerprint image sensor array;
a finger position sensing circuit configured to sense a position of the finger relative to the linear one-dimensional capacitive fingerprint image sensor array; and
a processing apparatus configured to provide to a user, in response to a position of the finger as sensed by the position sensing circuit, an indication indicating a finger movement needed to correctly position the finger relative to the linear one-dimensional capacitive fingerprint image sensor array to begin a fingerprint image sensing swipe over the linear one-dimensional capacitive fingerprint image sensor array.

18. The fingerprint sensing system as defined in claim 17, wherein the processing apparatus includes a visual display device and wherein the indication comprises a visual display of an actual finger placement relative to the position of the linear one-dimensional capacitive fingerprint image sensor array.

19. The fingerprint sensing system as defined in claim 17, wherein the indication comprises a display of the actual finger placement relative to the linear one-dimensional capacitive fingerprint image sensor array and a desired finger placement relative to the linear one-dimensional capacitive fingerprint image sensor array.

20. The fingerprint sensing system as defined in claim 17, wherein the processing apparatus is configured to determine a tilt angle of the finger and to display the tilt angle.

21. The fingerprint sensing system as defined in claim 17, wherein the processing apparatus comprises an audible output device configured to provide an audible indication of the finger movement needed to correctly position the finger relative to the linear one-dimensional capacitive fingerprint image sensor array.

22. The fingerprint sensing system as defined in claim 17, wherein the processing apparatus includes a computer monitor configured to display the indication.

23. The fingerprint sensing system as defined in claim 22, wherein the processing apparatus is configured to generate on the computer monitor a side view of an actual finger placement relative to the linear one-dimensional capacitive fingerprint image sensor array.

24. The fingerprint sensing system as defined in claim 22, wherein the processing apparatus is configured to generate on the computer monitor a top view of an actual finger placement relative to the linear one-dimensional capacitive fingerprint image sensor array.

25. The fingerprint sensing system as defined in claim 22, wherein the processing apparatus is configured to generate on the computer monitor a visual cue to start a swipe of the finger.

26. The fingerprint sensing system as defined in claim 17, wherein the processing apparatus includes light-emitting devices configured to indicate the finger movement needed to correctly position the finger relative to the linear one-dimensional capacitive fingerprint image sensor array.

27. A tangible machine readable medium storing instructions that, when executed by a computing device, cause the computing device to perform a method, the method comprising:
determining, based on input from a finger position sensing circuit, axially aligned to a direction of motion of a finger of a user during a swipe of the finger over a linear one-dimensional capacitive fingerprint image sensor array, a position of the finger relative to the linear one-dimensional capacitive electronic fingerprint image sensor array; and
providing to the user, in response to the position of the finger as sensed by the finger position sensing circuit, an indication that the finger is properly positioned to begin a fingerprint image sensing swipe across the linear one-dimensional capacitive fingerprint image sensor array.

\* \* \* \* \*